United States Patent [19]

Tsuno

[11] Patent Number: 4,740,681
[45] Date of Patent: Apr. 26, 1988

[54] STAR SENSOR FOR ATTITUDE DETECTION OF A SPINNING SATELLITE

[75] Inventor: Katsuhiko Tsuno, Yokohama, Japan

[73] Assignee: Kabushiki Kaisha Toshiba, Kawasaki, Japan

[21] Appl. No.: 28,089

[22] Filed: Mar. 19, 1987

[30] Foreign Application Priority Data

Mar. 20, 1986 [JP] Japan .................................. 61-63220

[51] Int. Cl.$^4$ ............................................. G01B 11/27
[52] U.S. Cl. .................. 250/203 R; 356/152
[58] Field of Search ................ 250/203 R, 203 S, 578; 356/141, 152

[56] References Cited

U.S. PATENT DOCUMENTS 4,181,851  1/1980  Allen et al. ...................... 250/203 R
4,388,646  6/1983  Strother ........................... 250/203 R Primary Examiner—Edward P. Westin
Assistant Examiner—Khaled Shami
Attorney, Agent, or Firm—Oblon, Fisher, Spivak, McClelland & Maier

[57] ABSTRACT

A star sensor mounted in a satellite subjected to a spinning motion includes an optical system for obtaining an image of a fixed star, a CCD area sensor as an image pickup device arranged at a focal point of the optical system, a signal processing circuit for receiving an output from the CCD area sensor through a preamplifier, and a CCD driving circuit connected to the CCD area sensor. The CCD area sensor is an interline type CCD. The optical axis of the optical system is perpendicular to a spinning axis of the satellite. The horizontal scanning direction of the CCD area sensor coincides with the direction of the spinning axis. For this reason, the star image is moved on the light-receiving surface of the CCD area sensor along the vertical scanning direction with the spinning motion of the satellite. The CCD driving circuit causes the CCD area sensor to perform time-delay integration at a speed corresponding to the spinning speed of the satellite. After one-frame information obtained by the photoelectric transducer is transferred (frame shift) to the vertical transfer CCD arrays, only a one-horizontal line component is read out for a period between one frame shift and the next frame shift. Therefore, movement of the star image on the photoelectric transducer is synchronized with the transfer speed of the signal charge in the vertical transfer CCD arrays, and thus the signal charge of the star image can be integrated in the vertical transfer CCD arrays.

3 Claims, 4 Drawing Sheets

STAR SENSOR FOR ATTITUDE DETECTION OF A SPINNING SATELLITE

BACKGROUND OF THE INVENTION

The present invention relates to a star sensor for measuring an azimuth and an elevation angle of a fixed star observed from a satellite so as to detect an attitude of the satellite, which is subjected to a spinning motion.

A satellite spins to stabilize its attitude. However, a slight change in mass of the satellite and other disturbances can cause unnecessary rotation and deviation of a spinning axis from a predetermined direction. As a result, a positional error of the satellite's attitude occurs. In order to prevent this, an azimuth and an elevation angle of a fixed star observed from a satellite are detected and the fixed star is identified. These detected values are compared with those obtained when the satellite is located at a predetermined attitude. As a result, the attitude of the satellite is detected.

A conventional star sensor is shown in FIG. 1. Slit plate 4 is arranged on a focal plane of optical system 2 and has two slits A1 and A2 formed in a V shape. Three slits constituting an N shape may be formed in slit plate 4 in place of V slits. Photomultiplier 6 is arranged as a photosensor on an optical axis of optical system 2 behind slit plate 4. An output from image intensifier tube 6 is supplied to signal processing circuit 8. A satellite spins about axis 10 in a direction indicated by arrow ω, axis 12 of the optical system is perpendicular to spinning axis 10, slit plate 4 is perpendicular to optical axis 12 of the optical system, and a direction along which slit A1 extends is parallel to spinning axis 10.

In this conventional star sensor, star image 14 formed by optical system 2 is moved by the spinning motion spinning of the satellite, as shown in FIG. 2A and sequentially crosses slits A1 and A2. At this time, a light beam from the star passing through slit plate 4 is detected by image intensifier tube 6, and a pulse having amplitude Is corresponding to a light intensity is supplied to signal processing circuit 8. As described above, since slit plate 4 has V-shaped slits A1 and A2, two pulses corresponding to slits A1 and A2 are generated for one star image 14, as shown in FIG. 2B. Time interval T between the pulses is determined by a distance between slits A1 and A2. An incident angle (i.e., an elevation angle of a fixed star) is determined whether star image 14 crosses the upper portion (a small distance between slits A1 and A2) or crosses the lower portion (a large distance between slits A1 and A2). Timings for generating these pulses are determined by a phase angle within one spinning cycle (360°) of the satellite, i.e., an azimuth of the fixed star. Therefore, the pulse generation timings and pulse time interval T are detected by signal processing circuit 8, thereby detecting the azimuth and the elevation angle of the fixed star and hence identifying the fixed star.

However, since image intensifier tube 6 is an electron tube, a high-voltage power source of 1 to 2 kV is undesirably required. In addition, the power source requires high power consumption. The electron tube is large and heavy and has poor reliability. The electron tube poses many problems when it is mounted in a satellite.

A solid-state star sensor has been developed wherein an Si photodiode is used as a photosensor in place of an image intensifier so as to provide a compact, lightweight sensor having low power consumption. An example of such a star sensor is shown in FIG. 3. In this star sensor, two linear Si photodiodes 16 and 18 are arranged in a V shape, and a preamplifier 20 is connected to the output of the photodiodes 16 and 18.

However, the Si photodiode has poor sensitivity as compared with the image intensifier tube and is adversely affected by noise. It is therefore difficult to detect a star darker than a star of the second magnitude or less.

SUMMARY OF THE INVENTION

It is an object of the present invention to provide a compact, lightweight star sensor having low power consumption and high sensitivity.

According to the present invention, a charge transfer type image sensor is used as a photosensor, and this image sensor is time-delay integrated in synchronism with the spinning motion of a satellite to increase time required for photoelectric conversion of a star image. Therefore, the sensitivity of the compact, lightweight charge transfer type image sensor having low power consumption can be increased.

DETAILED DESCRIPTION OF THE PREFERRED EMBODIMENT

Figure 1:
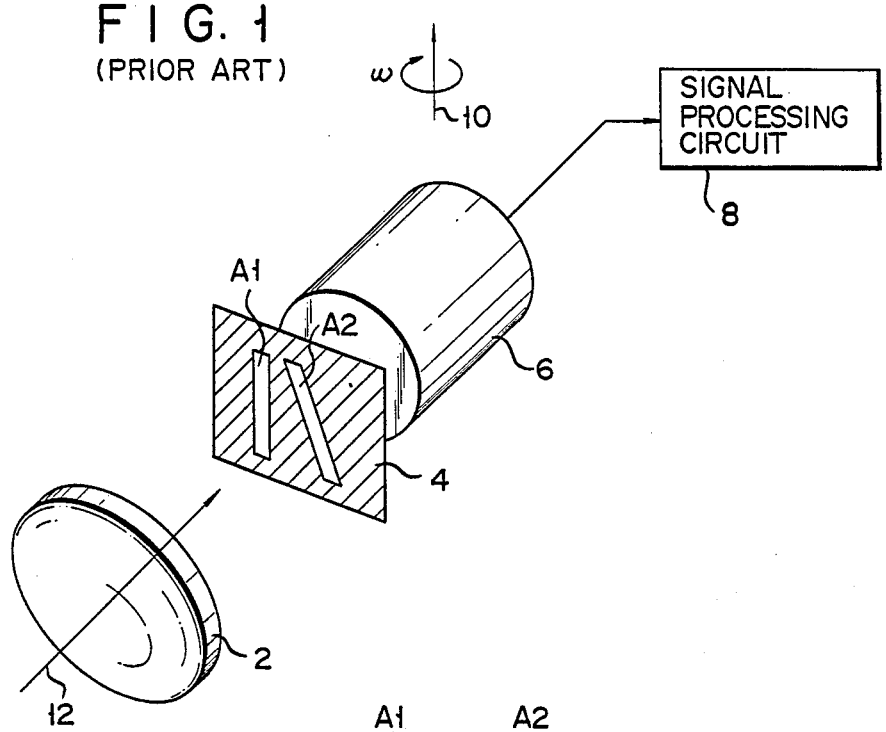
FIG. 1 is a block diagram of a conventional star sensor.
Figure 2A:
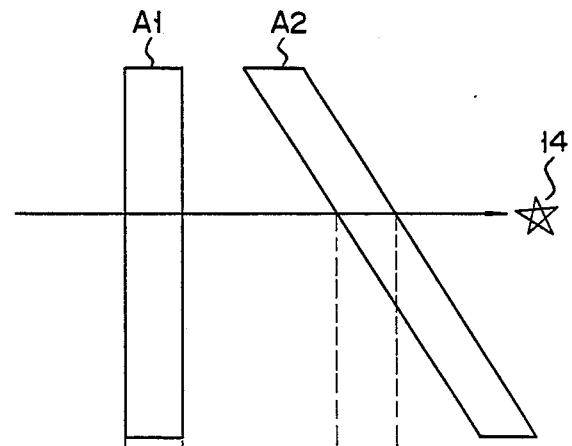
FIGS. 2A and 2B are views for explaining the operation of the conventional star sensor.
Figure 2B:
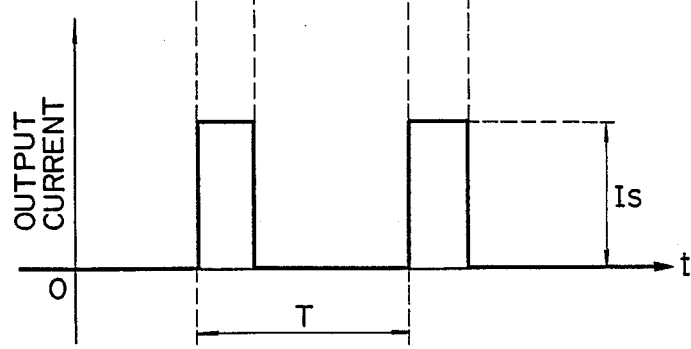
Figure 3:
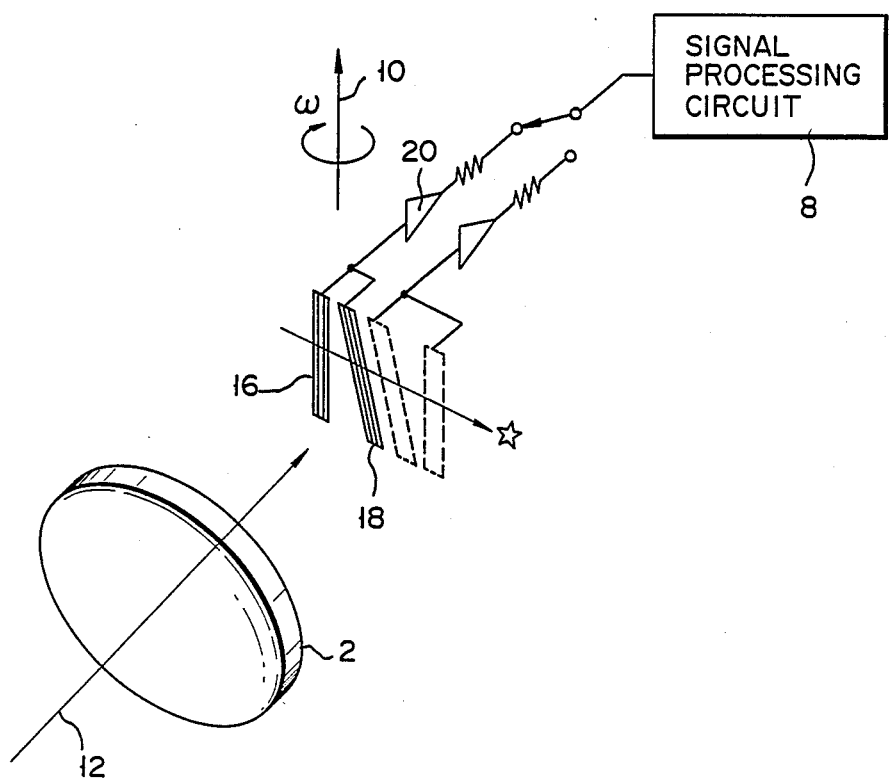
FIG. 3 is a block diagram of a conventional solid-state star sensor.
Figure 4:
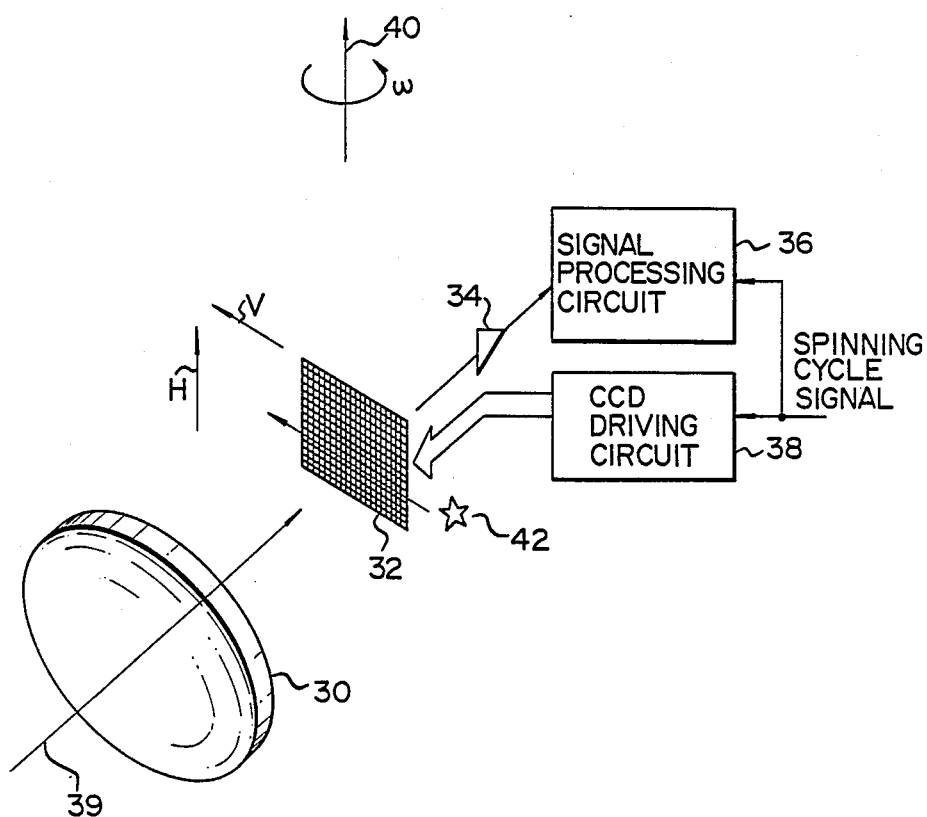
FIG. 4 is a block diagram of a star sensor according to an embodiment of the present invention.

A star sensor according to an embodiment of the present invention will be described with reference to the accompanying drawings. In FIG. 4, CCD area sensor 32 serving as an image pickup device is arranged at a focal plane of optical system 30 for obtaining an image of a fixed star. Sensor 32 comprises a conventional interline type CCD. More specifically, sensor 32 comprises a photoelectric transducer consisting of a large number of photoelectric converter elements (photodiodes) arranged in a matrix form, vertical transfer CCD arrays comprising CCD register arrays arranged between the vertical photodiode arrays, and a horizontal transfer CCD array of one CCD register array connected to outputs of all vertical transfer CCD arrays. Optical axis 39 of optical system 30 is perpendicular to spinning axis 40. Horizontal scanning direction H (the direction of horizontal transfer CCD array) of CCD area sensor 32 coincides with the direction of axis 40. For this reason, star image 42 on the light-receiving surface of sensor 32 is moved linearly by the spinning motion of the satellite. This moving direction coincides with the vertical scanning direction (the direction of the vertical transfer CCD array) V of sensor 32.

An output from CCD area sensor 32 is supplied to signal processing circuit 36 through preamplifier 34. CCD driving circuit 38 is connected to sensor 32. CCD driving and signal processing circuits 38 and 36 receive a spinning cycle signal as a timing pulse synchronized with the spinning cycle of the satellite.

Figure 5:
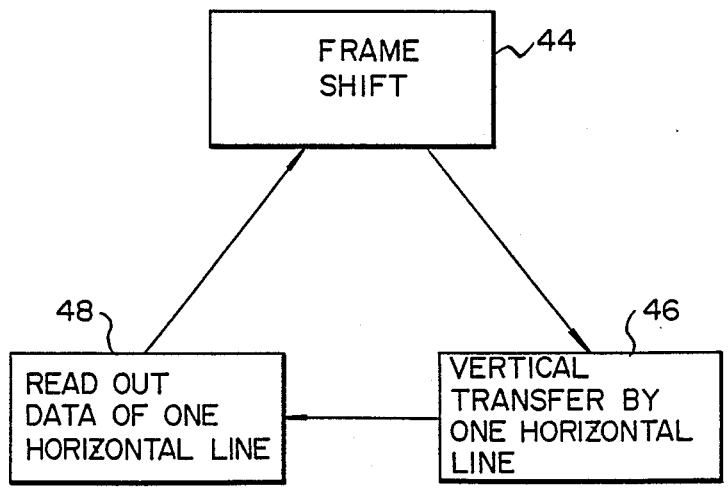
FIG. 5 is a view showing one read cycle of a CCD area sensor in the star sensor shown in FIG. 4.

Driving of CCD area sensor 32 by CCD driving circuit 38 is different from that of a conventional television camera. After one-frame information obtained by the photoelectric transducer is transferred (frame shift) to the vertical transfer CCD arrays, the entire one-frame information is not read out through the vertical transfer CCD arrays and horizontal transfer CCD array until the next frame shift, but only a one-horizontal line component is read out for a period between one frame shift and the next frame shift. As shown in FIG. 5, the read operation of CCD area sensor 32 is defined by one cycle of frame shift step 44, vertical transfer step 46 of one horizontal line information of the vertical transfer CCD arrays, and data read-out step 48 of one horizontal line from the horizontal transfer CCD array. The above cycle is repeated. In other words, signal charge shifted from a predetermined photodiode to the CCD register included in the vertical transfer CCD array at a given frame shift timing is stored in a CCD register of the vertical transfer CCD array next to (vertical direction) the above mentioned CCD register at the next frame shift timing. For this reason, the repetition speed of the read cycle (i.e., the vertical transfer cycle of CCD area sensor 32) is determined in accordance with the moving speed of the star image formed on the light-receiving surface of sensor 32 upon spinning of the satellite. Therefore, the signal charge generated by the photoelectric transducer upon a displacement of the star image is integrated by the vertical transfer CCD array for every frame shift time. In other words, time-delay integration is performed. Therefore, the time required for sensor 32 to photoelectrically convert the star image can be substantially prolonged, and sensor sensitivity can be greatly improved.

Figure 6:
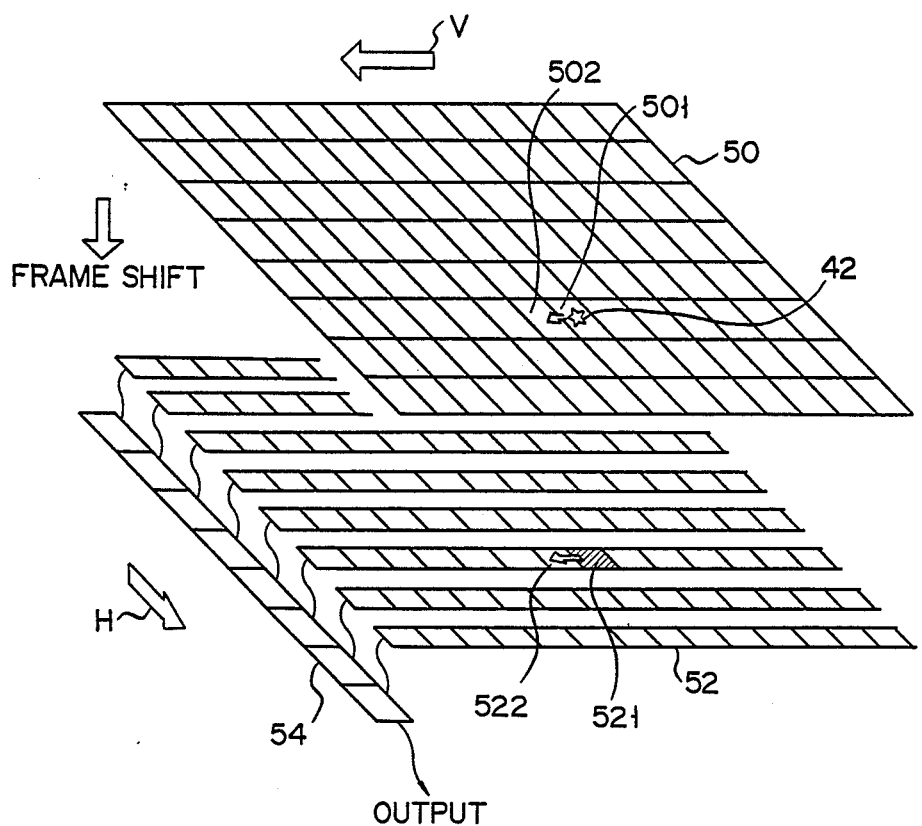
FIG. 6 is a view showing time-delay integration of the CCD area sensor shown in FIG. 4.

FIG. 6 illustrates the operation of time-delay integration. Assume that star image 42 is formed on photodiode 501 in photoelectric transducer 50. The signal charge derived from image 42 is shifted to CCD register 521 (corresponding to photodiode 501) in the vertical transfer CCD arrays 52 by a frame shift. When image 42 is shifted to photodiode 502 next to (the vertical transfer direction) photodiode 501 with the spinning of the satellite, the signal charge has been transferred to CCD register 522 next to CCD register 521 by the operation of vertical transfer CCD arrays 52. A frame shift is performed to shift the signal charge of a star image formed on photodiode 502 to CCD register 522. The signal charge obtained by each frame shift of sensor 32 is added to the signal charges of previous cycles in the vertical transfer CCD arrays.

By doing such time-delay integration, the accumulation time of the star image in sensor 32 is equal to the time required for star image 42 to pass through photoelectric transducer 50 in sensor 32 along vertical scanning direction V, and thus sensor sensitivity can be greatly improved. The sensor can detect a star of the sixth magnitude. Reference numeral 54 denotes a horizontal transfer CCD array.

Signal processing circuit 36 calculates an azimuth and an elevation angle of a fixed star on the basis of outputs from CCD area sensor 32. The azimuth is determined by a detection timing of the star image within one spinning cycle of the satellite in the same manner as in the conventional method. The elevation angle is determined by a position of the photodiode generating star image 42 along the horizontal scanning direction.

Figure 7:
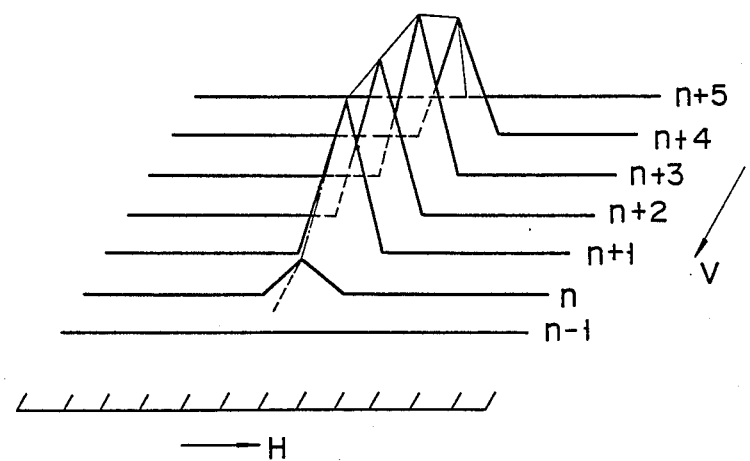
FIG. 7 is a view showing a signal carrier distribution of a star image detected by the CCD area sensor shown in FIG. 4.

Star image 42 may extend to cover several pixels due to the aberration of optical system 30, an error caused by a difference between the moving speed of star image 42 and the transfer speed of time-delay integration on CCD area sensor 32, and the like. In this case, an output from CCD area sensor 32 is illustrated as a three-dimensional image, as shown in FIG. 7. The centroid of this image is obtained to improve precision of star position detection. Reference symbol n is any integer.

The time-delay integration speed must be adjusted according to variations in the satellite's spinning cycle. This adjustment can be automatically achieved by a command broadcast from the earth, another position sensor mounted in the satellite, e.g., a solar sensor, on the basis of the spinning cycle information, or the like.

In the above embodiment, an interline type CCD is used. However, a frame transfer type CCD or a BBD may be used as an image pickup device.

According to the present invention as described above, the signal charge of the star image obtained by the image sensor is time-delay integrated to effectively prolong the photoelectric conversion time of the star image and to improve the sensitivity of the image sensor. A compact, lightweight star sensor having low power consumption and high sensitivity can therefore be provided.

What is claimed is:

1. A star sensor mounted in a satellite which is subjected to a spinning motion, comprising:
   an optical system for obtaining an image of a fixed star;
   image pickup means for picking up the image of the fixed star, said image pickup means being provided with a photoelectric transducer having a large number of photoelectric transducer elements arranged in a matrix form, and a charge transfer section for sequentially scanning and reading out signal charges from said photoelectric transducer elements, a horizontal scanning direction of said image pickup means being adapted to coincide with a spinning axis of the satellite;
   driving means for causing said image pickup means to perform time-delay integration at a speed in accordance with a spinning speed; and
   means for calculating an azimuth and an elevation angle of the fixed star in response to signal output timings of said image pickup means within a spinning cycle.

2. A star sensor according to claim 1, in which said driving means repeats a cycle consisting of a frame shift step for shifting an output signal charge from said photoelectric transducer to said charge transfer section, a step for transferring, by one horizontal line, the signal charge shifted in said charge transfer section along a vertical scanning direction, and a read step for reading out a signal charge of one horizontal line, a repetition speed of the step for transferring the signal charge along the vertical scanning direction being equal to a moving speed of the image of the fixed star upon spinning of the satellite.

3. A star sensor according to claim 2, in which said image pickup means comprises an interline charge-coupled device.

* * * * *